United States Patent
Hennig

(10) Patent No.: US 10,166,821 B2
(45) Date of Patent: Jan. 1, 2019

(54) SMALL TRAILER TIRE INFLATION SYSTEM

(71) Applicant: Equalaire Systems, Inc., Corpus Christi, TX (US)

(72) Inventor: Mark Kevin Hennig, Corpus Christi, TX (US)

(73) Assignee: Equalaire Systems, Inc., Corpus Christie, TX (US)

( * ) Notice: Subject to any disclaimer, the term of this patent is extended or adjusted under 35 U.S.C. 154(b) by 0 days.

(21) Appl. No.: 15/706,533

(22) Filed: Sep. 15, 2017

(65) Prior Publication Data

US 2018/0022170 A1 Jan. 25, 2018

Related U.S. Application Data

(62) Division of application No. 14/258,804, filed on Apr. 22, 2014, now Pat. No. 9,789,739.

(60) Provisional application No. 61/815,003, filed on Apr. 23, 2013.

(51) Int. Cl.
  *B60C 23/00* (2006.01)
  *B60S 5/04* (2006.01)

(52) U.S. Cl.
  CPC .......... *B60C 23/009* (2013.01); *B60C 23/003* (2013.01); *B60S 5/04* (2013.01)

(58) Field of Classification Search
  CPC ..... B60C 23/00; B60C 23/001; B60C 23/003; B60C 23/004; B60C 23/009
  See application file for complete search history.

(56) References Cited

U.S. PATENT DOCUMENTS

| | | | |
|---|---|---|---|
| 4,641,698 A | 2/1987 | Bitonti |
| 5,111,762 A | 5/1992 | Frangiamore |
| 5,377,736 A | 1/1995 | Stech |
| 5,452,753 A | 9/1995 | Olney |
| 5,584,949 A | 12/1996 | Ingram |
| 5,769,979 A | 6/1998 | Naedler |
| 6,105,645 A | 8/2000 | Ingram |
| 6,131,631 A | 10/2000 | Bradley et al. |
| 6,145,559 A | 11/2000 | Ingram, II |
| 6,269,691 B1 | 8/2001 | Sowatzke et al. |
| 6,325,123 B1 | 12/2001 | Gao et al. |
| 6,325,124 B1 | 12/2001 | Colussi et al. |
| 6,394,556 B1 | 5/2002 | Ingram |
| 6,401,743 B1 | 6/2002 | Naedler |
| 6,425,427 B1 | 7/2002 | Stech |
| 6,668,888 B1 | 12/2003 | Beesley et al. |
| 6,698,482 B2 | 3/2004 | Hennig et al. |
| 6,892,778 B2 | 5/2005 | Hennig et al. |
| 6,938,658 B2 | 9/2005 | Jarrett et al. |
| 7,185,688 B2 | 3/2007 | Hayes et al. |
| 7,273,082 B2 | 9/2007 | White et al. |
| 7,302,979 B2 | 12/2007 | Davison et al. |
| 7,416,005 B2 | 8/2008 | Hennig et al. |
| 7,963,159 B2 | 6/2011 | Ingram et al. |
| 8,931,534 B2 | 1/2015 | Eaton et al. |

(Continued)

*Primary Examiner* — Jason R Bellinger
(74) *Attorney, Agent, or Firm* — Pizarro Allen PC

(57) ABSTRACT

A tire inflation system for a small trailer may include a fluid pressure source mountable to the trailer, and fluid conduits providing sealed fluid communication between the fluid pressure source and the small trailer's pneumatic tires. The system may further include a fluid connector configured for connection to an external fluid power source.

21 Claims, 5 Drawing Sheets

(56) References Cited

U.S. PATENT DOCUMENTS

| | | | |
|---|---|---|---|
| 9,789,739 B1* | 10/2017 | Hennig | B60C 23/003 |
| 2003/0071513 A1 | 4/2003 | Elkow | |
| 2004/0173296 A1 | 9/2004 | White et al. | |
| 2009/0266460 A1 | 10/2009 | Resare et al. | |
| 2013/0306192 A1 | 11/2013 | Hennig | |
| 2015/0275882 A1 | 10/2015 | Joyce et al. | |
| 2018/0001718 A1* | 1/2018 | Hennig | B60C 23/009 |

* cited by examiner

SMALL TRAILER TIRE INFLATION SYSTEM

CROSS-REFERENCE TO RELATED APPLICATIONS

This application is a division of U.S. patent application Ser. No. 14/258,804 entitled "SMALL TRAILER TIRE INFLATION SYSTEM" filed Apr. 22, 2014, which issued as U.S. Pat. No. 9,789,739 on Oct. 17, 2017, which claims benefit of U.S. Provisional Patent Application Ser. No. 61/815,003 entitled "SMALL TRAILER TIRE INFLATION SYSTEM" filed Apr. 23, 2013, the entire disclosures of which are herein incorporated by reference.

FIELD

This field generally relates to tire inflation systems for small trailers.

BACKGROUND

Many small trailers, such as light- and medium-duty trailers, have two or more pneumatic tires requiring inflation as specified by the tire manufacturer. Such trailers may have a variety of uses, may be used infrequently, and often have improperly inflated tires. There remains a need for a tire inflation system for such trailers.

SUMMARY

A tire inflation system for a small trailer comprising an axle and a pneumatic tire mounted at each end of the axle, the system comprising a first rotary fluid connection mounted at a first end of the trailer axle and in sealed fluid communication with a first pneumatic tire mounted at the first end of the trailer axle; a second rotary fluid connection mounted at a second end of the trailer axle and in sealed fluid communication with a second pneumatic tire mounted at the second end of the trailer axle; a fluid connector configured for sealed connection to an fluid pressure source external to the small trailer, the first rotary fluid connection and the second rotary fluid connection being in sealed fluid communication with the fluid connector such that fluid flowing into the fluid connector from the stationary fluid pressure source may flow substantially simultaneously into the first and second pneumatic tires; a first one-way valve disposed between and in sealed fluid communication with the fluid connector and the first pneumatic tire, the first one-way valve disposed so as to allow fluid to flow to the first pneumatic tire and not from the first pneumatic tire to the fluid connector or to the second pneumatic tire; a second one-way valve disposed between and in sealed fluid communication with the fluid connector and the second pneumatic tire, the second one-way valve disposed so as to allow fluid to flow to the second pneumatic tire and not from the second pneumatic tire to the fluid connector or to the first pneumatic tire.

A tire inflation system for a small trailer comprising an axle and a pneumatic tire mounted at each end of the axle, the system comprising a fluid pressure source mounted to the small trailer, the fluid pressure source powerable by energy provided by a small-trailer tow vehicle; a fluid conduit providing sealed fluid communication between the fluid pressure source and each pneumatic tire so as to allow pressurized fluid from the trailer-mounted fluid pressure source to flow from the fluid pressure source to each pneumatic tire; and a fluid connector providing sealed fluid communication with the pneumatic tires, the fluid connector comprising a one-way valve configured for sealed fluid communication with an external fluid pressure source so as to allow fluid to flow from the external fluid pressure source to each pneumatic tire.

A method of inflating small trailer pneumatic tires, the small trailer comprising an axle and a pneumatic tire mounted at each end of the axle, the method comprising providing a fluid connector comprising a one-way valve configured for sealed fluid communication with an external fluid pressure source not mounted to the small trailer or to a tow vehicle; providing sealed fluid communication between the fluid connector and each pneumatic tire; and connecting the fluid connector to the external fluid pressure source so as to allow pressurized fluid to flow from the fluid pressure source to each pneumatic tire substantially simultaneously.

DETAILED DESCRIPTION

Figure 1A:
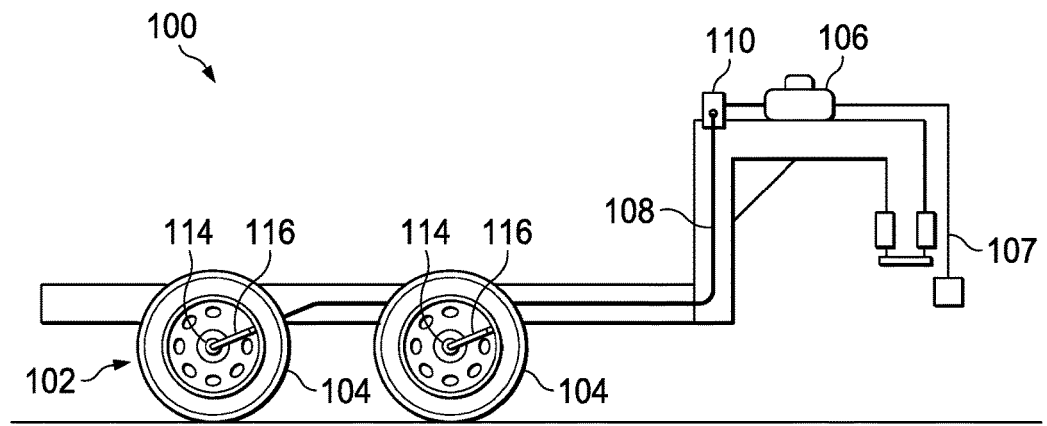
FIG. 1A illustrates a side view of an embodiment of a trailer inflation system having a fluid source mounted to the trailer.
Figure 1B:
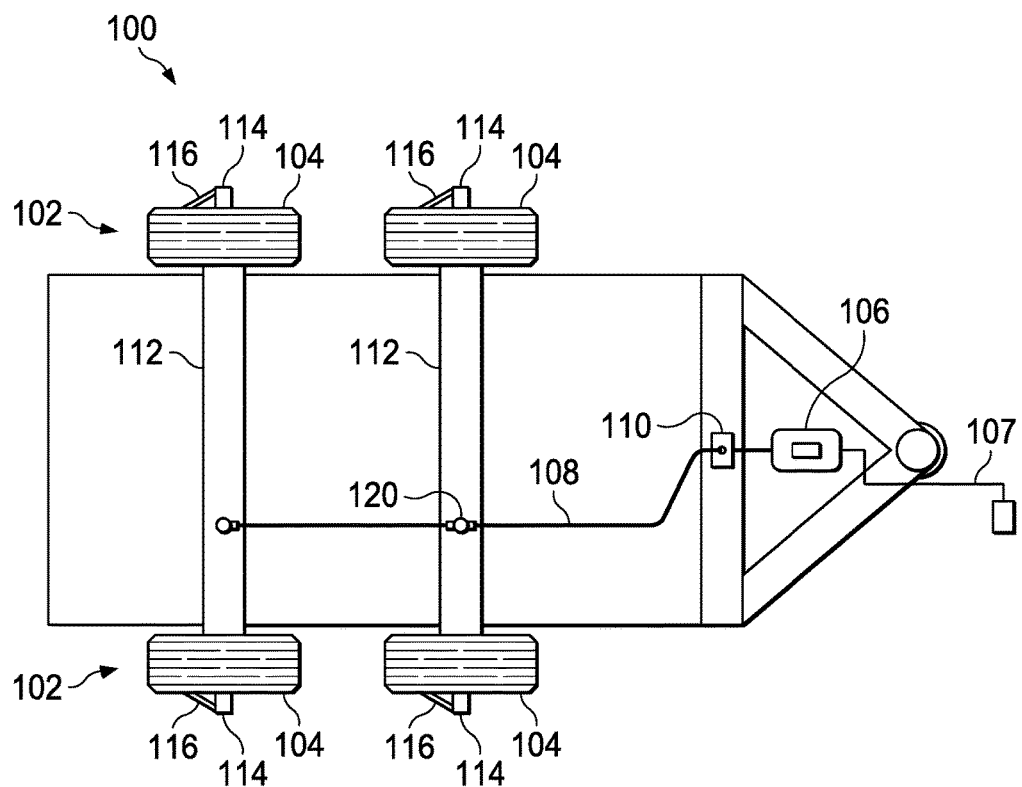
FIG. 1B illustrates a bottom view of an embodiment of a trailer inflation system having a fluid source mounted to the trailer.

As may be seen in the embodiment of FIG. 1, a trailer 100 may include one or more axles 112. As may be seen in the top and side views of trailer 100, each axle 112 may have one or more wheels 102 rotatably mounted thereto. A wheel assembly at the end of an axle may include a variety of wheel configurations, e.g., single-wheel configuration or a dual-wheel configuration. A pneumatic tire 104 may be mounted to each wheel 102. Each axle 112 may have one tire 104 at each end of the axle 112, or may have two or more tires 104 attached at each end of the axle 112. A hub cap 114 or grease cap may be mounted to each wheel 102 to substantially seal the wheel bearings (not shown) from contamination.

The trailer 100 may be any trailer of the sort capable of being pulled by a non-class 8 vehicle. Such trailers may include, for example, boat trailers, horse trailers, flatbed trailers, vehicle tow trailers, cargo trailers, livestock trailers, jet ski trailers, travel trailers, pop-up camper trailers, RV trailers, and utility trailers. Such trailers may be attached to any suitable vehicles, such as a pickup truck, a passenger car, van, SUV, ATV, motorcycle or other vehicle. Such trailers may be attachable to such vehicle by a bumper-mounted hitch ball, clevis hitch, or fifth-wheel or gooseneck hitch configuration, or any other suitable attachment mechanism. Such trailers may include no brakes, or may include electrically-operated brakes powered by a tow vehicle, or may include hydraulic or surge brakes. The disclosed method and apparatus may generally be used for trailers without air brakes.

The trailer 100 may be provided with a tire inflation system (TIS) that uses pressurized air to maintain the tires 104 at or fill the tires 104 to a desired air pressure. The TIS may comprise an on-board air compressor 106 mounted to the trailer 100 at any suitable location. The air compressor 106 may be any suitable air compressor, such as a compressor driven by electric motor or combustion engine. If, for example, the compressor 106 is electrically driven, the compressor may be powered by a battery or generator mounted to the trailer 100, or may be powered by the vehicle to which the trailer 100 is attached. An electric compressor may, for example, run from a 12V or 24V vehicle electrical system, and may be connected to a tow vehicle by electrical connection 107. Electric air compressors may be of any suitable make and model, such as Hadley 850 Series Mini Compressor, Oasis XD 3000 Extreme Duty Air Compressor, Viair 495C Air Compressor, Chassis Tech DC7000 Air Compressor, Air Zenith OB2-200 Air Compressor, Pacbrake HP625 Series Air Compressor, and Helix UltraAer Air Compressor.

Figure 2A:
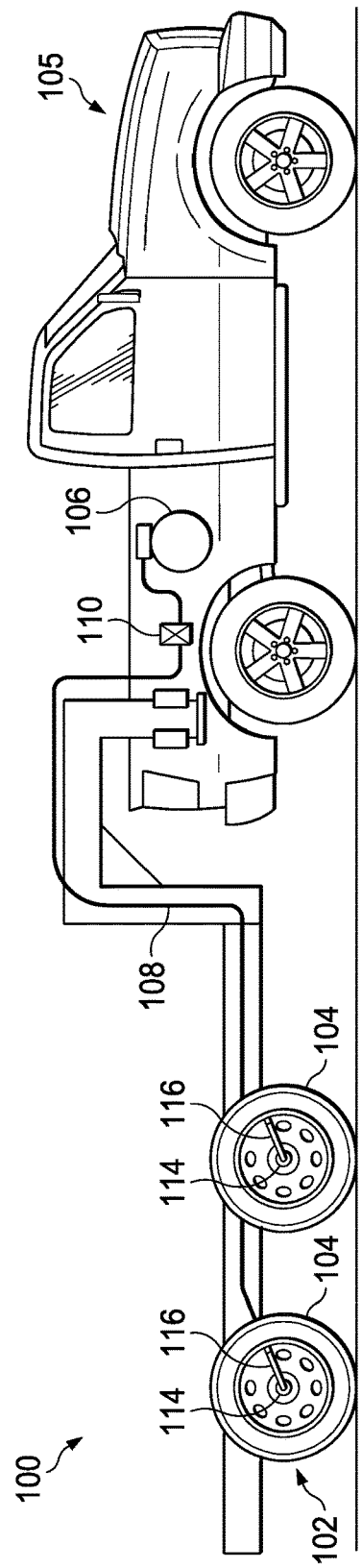
FIG. 2A illustrates a side view of an embodiment of a trailer inflation system having a fluid source mounted to the tow vehicle.
Figure 2B:
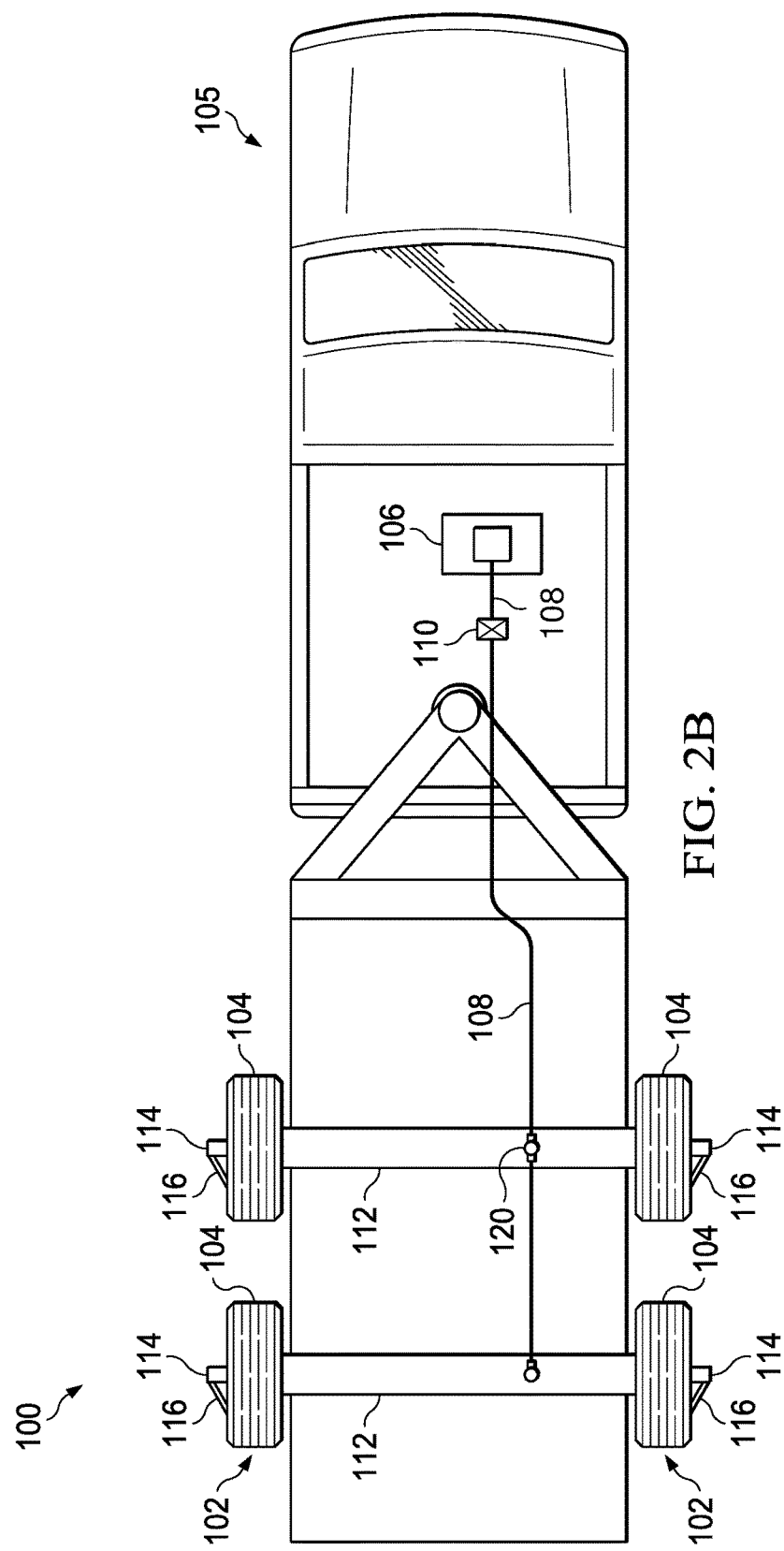
FIG. 2B illustrates a top view of an embodiment of a trailer inflation system having a fluid source mounted to the tow vehicle.

Of course, other pressure sources may be used, as well, either as an alternative to an air compressor, or in addition to an air compressor. In an embodiment, a trailer-mounted air pressure source may comprise a pressurized air tank or high-pressure compressed gas cylinder. The air tank or gas cylinder may be filled with any suitable tire pressurizing fluid, such as air, nitrogen-enriched air or pure nitrogen. In some embodiments, an air compressor may be provided on a tow vehicle 105. For example, a tow vehicle may have an air compressor driven by the vehicle engine, such as an air compressor mounted to the vehicle engine and driven by a belt. In other embodiments, an electric- or engine-powered air compressor 106 may be mounted at a different location on the vehicle 105, such as seen in the embodiment of FIG. 2. An electric compressor 106 mounted to the vehicle 105 may be powered by a 12V or 24V vehicle electrical system. In yet further embodiments, an engine-powered compressor may be mounted to, for example, the bed of a pickup truck. An air compressor may be used with or without an air tank to hold pressurized air.

The TIS may further comprise one or more air conduits 108 that may provide pressurized air to the tires 104. The air conduits 108 may comprise a variety of paths and configurations. In some embodiments, the air compressor may comprise a tank to hold pressurized air at a pressure suitable for delivery without pressure reduction to the tires. In other embodiments, such a tank may hold pressurized air at an air pressure that is too high for the trailer tire. An air conduit 108 may permit communication of pressurized air from the air compressor to a pressure regulator 110 that may reduce the air pressure to a pressure suitable for a trailer tire, such as, for example, 35 psi. A regulator may be of any suitable type, such as model LR-1/8-D-0-mini-NPT manufactured by Festo, and may be set to pass air through at any pressure suitable for maintaining a desired tire inflation pressure. An air filter may be provided to clean the air passing to the regulator, and a shut-off valve may be provided to selectively permit or prevent fluid communication between the air compressor and the regulator.

Figure 3A:
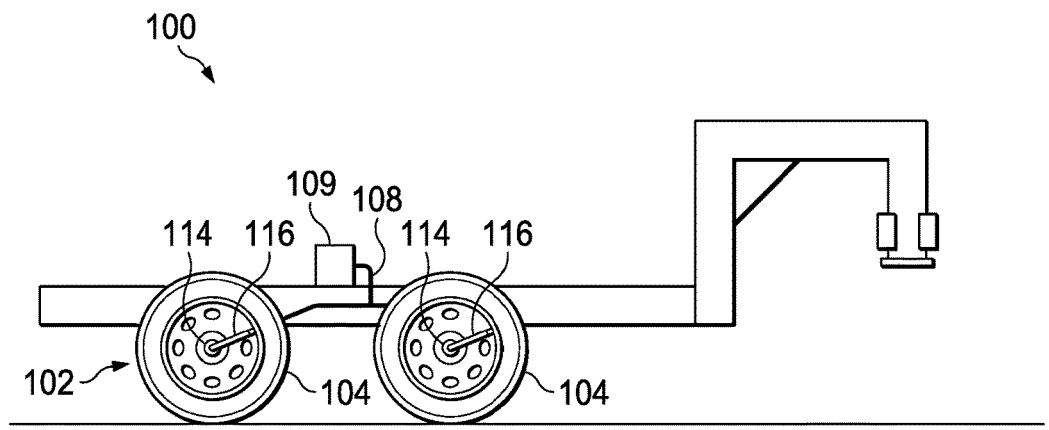
FIG. 3A illustrates a side view of an embodiment of a trailer inflation system including a control box.
Figure 3B:
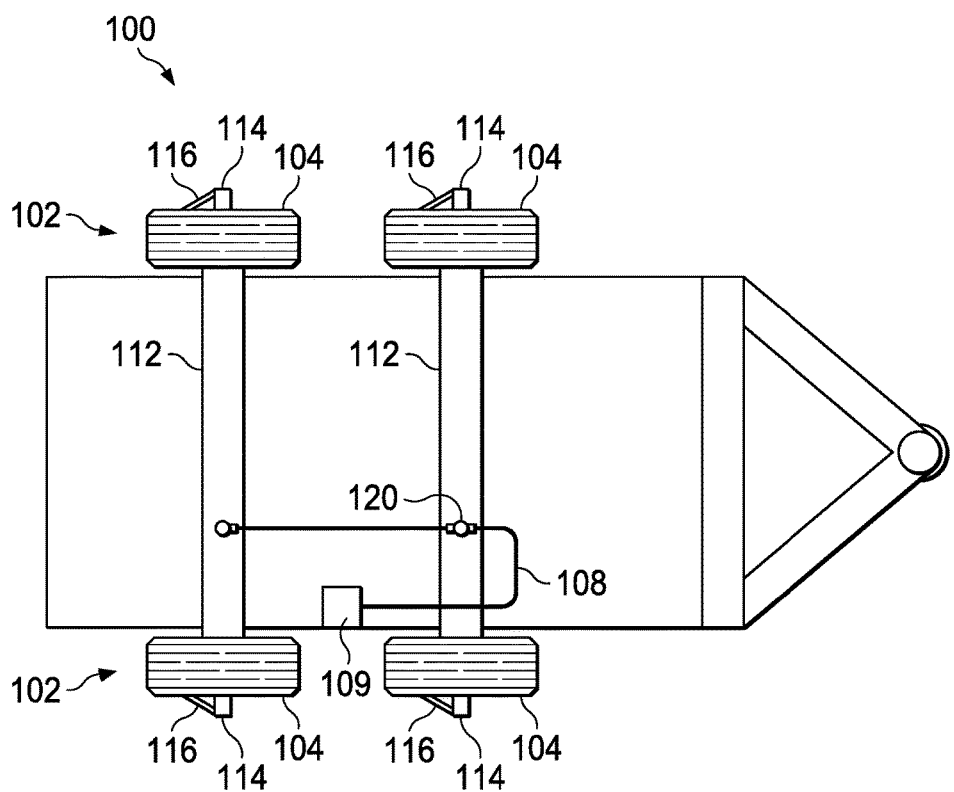
FIG. 3B illustrates a bottom view of an embodiment of a trailer inflation system including a control box.

In yet further embodiments, a source of pressurized air may be external to the trailer 100 and tow vehicle 105. Such a source may be, for example, a compressed-air tank or air compressor placed at a vehicle maintenance facility or service station, or on a service vehicle. For such an embodiment, a control box 109 may be provided as illustrated in FIG. 3 to house an air connection (not shown) for connecting the TIS to the external pressure source. The control box 109 may house one or more types of air connection, such as a tire valve, a quick-connect sleeve-type pneumatic coupling, and the like, and may serve to protect the air connection from damage and contamination. In yet further embodiments, a control box 109 may not be required, and conduit 108 may simply be provided with an air connection to allow sealing connection with the external air pressure source. In such an embodiment, all trailer tires may be inflated in a substantially simultaneous manner. Thus, for example, a trailer that has been stationary all night may have its tires quickly and simultaneously inflated before use by connecting the TIS to a garage or shop air pressure source. Similarly, providing a small trailer TIS may make it easier to inflate trailer tires at a truck stop, by avoiding the need for moving an external air source hose from tire to tire.

In yet other embodiments, a pressure relief valve ("PRV") may be provided in sealing fluid communication with the conduit 108. The PRV may be set to open when the TIS system pressure exceeds the pressure desired for the tires. Thus, if higher-pressure shop air is used to inflate the tires, a PRV may be used to prevent over-inflation.

In some embodiments, the pressurized air communicated from the air compressor may pass through the trailer axles. Some trailers may include hollow axles 112 that may be sealed at each end by a cap or plug, such as those described in one of U.S. Pat. Nos. 5,584,949, 5,769,979, 6,131,631, 6,394,556, 6,892,778, and 6,938,658, or by any other suitable threadable cap or insertable axle plug. The plug or cap, in some embodiments, may serve more to support air conduits or rotary air connections (or components thereof) than to seal the hollow axle to hold pressurized air, such as a plug or cap disclosed in one of U.S. Pat. Nos. 6,325,124 and 7,273,082. An air conduit may be sealingly connected between the air compressor and the axle, thus allowing communication of air from the air compressor to the sealed axles. Thus sealed, each axle may serve as part of the air conduit to communicate pressurized air to the tires. In other embodiments, an air conduit may be provided from the air compressor through the hollow axles without need for sealing the axles.

In yet other embodiments, the trailer axles may be solid. In such embodiments, an axial hole may be drilled in the axles, and the axles may be further sealed with a stator or with a plug as described above. Alternatively, an air conduit may be provided through the hole drilled in the solid axle without need for sealing the axle.

The TIS may further comprise a rotary air connection mounted on or in the wheel-end assembly to allow communication from air compressor to the rotatable tires so as to allow pressurization of the tires. Suitable rotary unions, and other suitable TIS components, may include those disclosed, for example, in U.S. Pat. Nos. 5,377,736, 6,698,482, 6,105, 645, 6,325,124, 6,325,123, 7,302,979, 6,269,691, 5,769,979, 6,668,888, 7,185,688, 7,273,082, 6,145,559, 6,425,427, 7,963,159, and U.S. Pat. Pub. No 2009/0266460, the disclosures of which are incorporated herein by reference. Thus, any suitable rotary coupling may be used to communicate air between the air compressor and the rotatable tires. For example, with respect to U.S. Pat. No. 5,769,979, a stator may be mounted in a hollow or axially-drilled axle. In some embodiments, a stator (not shown) may be mounted in a cap or plug sealing an axle, such as the one described above, or affixed to the end of an air conduit provided through a hollow or axially-drilled axle. A rotary connection 114 may be mounted to the rotating wheel, such as on a hub or grease cap (not shown), and air hoses 116 may be sealingly provided between the rotary connection and the tires.

Thus, in some embodiments, one or more trailer axles may be hollow sealed axles. The axles may be hollow and may be sealed to serve as part of a conduit for pressurized air. An air conduit may be sealingly connected to the axle to allow pressurized air to flow from the air compressor or pressure regulator to the axle. The pressurized air may flow through the axle to a rotary air connection mounted in or near the axle end as described in more detail below. An air hose may connect to the rotary air connection to a valve stem of a wheel to which the pneumatic tire is mounted, thus allowing pressurized air to flow to and/or from the tire. In some embodiments, the air conduit may be sealingly connected to a tee 120 to allow pressurized air to flow to a second axle.

An air conduit may, in other embodiments, be disposed in the trailer axle. The axle may carry an air conduit to communicate pressurized air to a rotary air connection, for example, such as is disclosed in U.S. Pat. Nos. 6,325,124 and 7,273,082. Air hoses may connect the rotary air connection to the valve stem of the wheel to which the pneumatic tire is mounted, thus allowing pressurized air to flow to and/or from the tire. In other embodiments, if the axle is solid, then a channel may be bored in the axle to permit positioning of all or part of conduit inside the axle.

Of course, any suitable rotary connection may be provided. In other embodiments, air conduits may be routed for external attachment to a rotary union mounted to the trailer wheels. In such embodiments, air conduits may be routed from the air compressor through brackets mounted to the trailer, such as to the trailer tire fenders. The air conduits may be sealingly connected to rotary air connections mounted to the trailer wheels.

Figure 4:
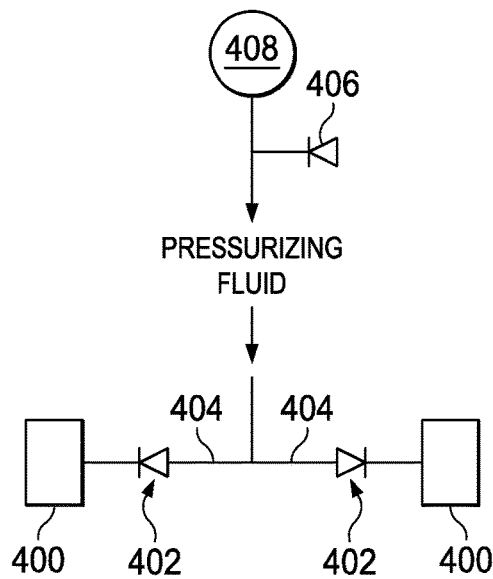
FIG. 4 illustrates an embodiment of a trailer inflation system including check valves.

In some embodiments, as may be seen in the embodiment of FIG. 4, a one-way fluid valve 402 may be used for each tire 400 in fluid communication with a TIS fluid source 408. A one-way valve 402 may be disposed in an air conduit 404 unique to a tire 400, and may permit pressurizing fluid to flow toward or into a tire 400, but not out away from or out of a tire. In some embodiments, a one-way valve may be used in connection with each tire. Thus, if one tire deflates, such as by puncture, the one-way valves may prevent pressurizing fluid from flowing from one or more inflated tires to the deflated tire. A one-way valve may be disposed, for example, in a rotary union, or in an air conduit between a rotary union and a tire, or in an air conduit between a rotary union and a pressure source.

In some embodiments, as also may be seen in FIG. 4, a TIS having a trailer-mounted or vehicle-mounted fluid pressure source 408 may also include a fluid connection 406 connectable to an external fluid pressure source (not shown). The fluid connection may simply allow for sealed fluid communication between an external fluid pressure source and the pneumatic tires. In other embodiments, the fluid connection may comprise a one-way valve. In such case, it may be desireable to avoid releasing pressurized fluid from the TIS through the fluid connection. Thus, a one-way valve may be used between the trailer- or vehicle-mounted fluid pressure source and the fluid connection to allow fluid to flow from the fluid connection to the TIS, but not from the TIS through the fluid connection. In one of a variety of embodiments, a trailer-mounted or vehicle-mounted fluid pressure source 408 may be omitted from the system, leaving only use of a fluid connection 406 connectable to an external fluid pressure source. In such embodiments, a fluid connection may prevent pressurized air from the TIS from escaping to the atmosphere. In other variations, a trailer-mounted or vehicle-mounted fluid pressure source 408 may be included from the system, while omitting a fluid connection 406 connectable to an external fluid pressure source.

Figure 5:
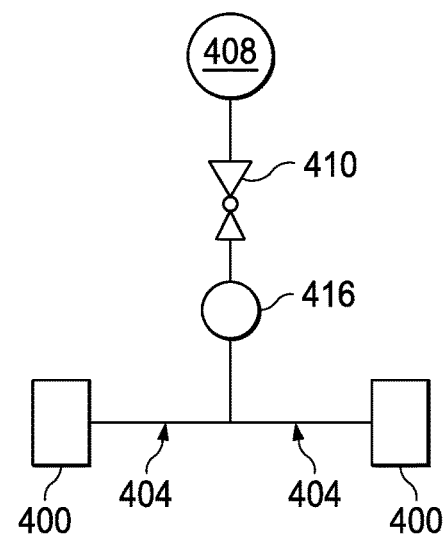
FIG. 5 illustrates an embodiment of a trailer inflation system including a pressure regulator and check valves.
Figure 6:
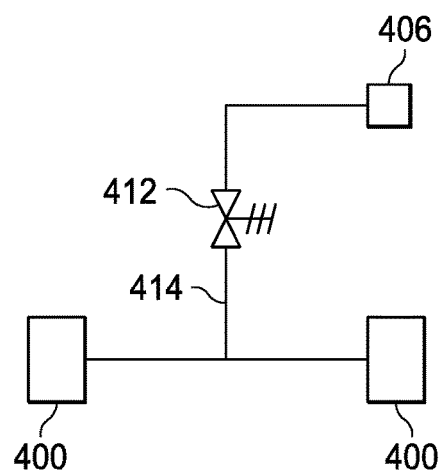
FIG. 6 illustrates an embodiment of a trailer inflation system including a pressure relief valve.

As may be seen in the embodiment of FIG. 5, a pressure regulator 410 may be used to reduce pressure from a pressure source 408 to a pressure suitable for a pneumatic tire. As may be seen in the embodiment of FIG. 6, a pressure relief valve (PRV) 412 may be used in sealed fluid communication 414 with the pneumatic tires 400 to prevent over-pressurization of the tires by fluid from an external fluid pressure source through a fluid connection 406. The PRV may be set to release fluid when the pressure in the system reaches a threshold. The threshold may, for example, be set at a pressure suitable for pressurizing small trailer pneumatic tires. Of course, the foregoing regulator, PRV, fluid connector and valves may be used in any combination.

In some embodiments, a high-temperature warning system, such as the ThermAlert™ system by PSI disclosed in U.S. Pat. Nos. 6,892,778 and 7,416,005, the disclosures of which are incorporated herein by reference, may be used in conjunction with a tire inflation system. Such a high-temperature warning system may use pressurized air provided via the regulator. In such embodiments, a flow switch 416 (with reference to FIG. 5) may be fluidly connected to an outlet port of a regulator (such as regulator 410) or otherwise connected in fluid communication with the air conduit. The flow switch may be connected to a shut-off valve (not shown), which may be connected to a temperature-actuated pressure barrier, such as a plug with a eutectic alloy that will melt when reaching a temperature dangerous to continued safe operation of the wheel end. A flow switch may be electrically-coupled to an indicator light that may illuminate when fluid flow through the flow switch exceeds a threshold flow. Air may thus flow from the regulator or air compressor through the flow switch and shut-off valve to the pressure barrier. If the pressure barrier senses high temperature, it may release pressurized air, thus activating the flow switch. When activated, the flow switch may send a signal to illuminate an indicator light positioned on the trailer within the driver's view. The flow switch may be powered by the power source provided to power an air compressor or by a battery or other power source, such as a solar panel.

In yet further embodiments, a flow switch may be provided without need for a high-temperature warning system. In such embodiments, a flow switch may activate when a tire is rapidly losing air. The flow switch may send a signal to illuminate an indicator light positioned on the trailer within the driver's view. The flow switch may be powered by the power source provided to power an air compressor or by a battery or other power source, such as a solar panel.

In some embodiments, the signal from the flow switch may be transmitted via wire or wirelessly to an indicator panel in the vehicle cab, or wirelessly to a mobile device. The indicator panel or terminal may provide visual or audible indicators of low tire pressure, and may further indicate whether the high-temperature warning system has detected a high temperature at a wheel-end assembly. Wireless transmission may be by any suitable technology, such as by satellite, Bluetooth, cellular network, WiFi, WiMax, etc.

In some embodiments, the disclosed TIS may be used in connection with tire pressure monitoring systems, such as the wireless tire pressure monitoring system offered by Pressure Pro. For example, a tire pressure sensor (not shown) may be located at a wheel end. The tire pressure sensor may detect tire pressure and send a signal indicating tire pressure to the driver or remote mobile device.

Of course, references to "air" with respect to tire inflation should be understood to include any gas or fluid suitable for inflating a tire, such as pure nitrogen or nitrogen-enriched air.

Although the disclosed embodiments and their advantages have been described in detail, it should be understood that various changes, substitutions and alterations can be made herein without departing from the subject matter defined by the appended claims. Moreover, the scope of the present disclosure is not intended to be limited to the particular embodiments of the process, machine, manufacture, composition, or matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods or steps.

What is claimed is:

1. A tire inflation system for a trailer capable of being pulled by a non-class 8 vehicle, the trailer comprising an axle and a pneumatic tire mounted at each end of the axle, but without air brakes, the system comprising:
    a first rotary fluid connection mounted at a first end of the trailer axle and in sealed fluid communication with a first pneumatic tire mounted at the first end of the trailer axle;
    a second rotary fluid connection mounted at a second end of the trailer axle and in sealed fluid communication with a second pneumatic tire mounted at the second end of the trailer axle;
    a fluid connector configured for sealed connection to an external fluid pressure source external to the trailer and the vehicle, the first rotary fluid connection and the second rotary fluid connection being in sealed fluid communication with the fluid connector such that fluid flowing into the fluid connector from the external fluid pressure source may flow substantially simultaneously into the first and second pneumatic tires;
    a first one-way valve in sealed fluid communication with the fluid connector and the first pneumatic tire, the first one-way valve disposed so as to allow fluid to flow to the first pneumatic tire and not from the first pneumatic tire to the fluid connector or to the second pneumatic tire;
    a second one-way valve disposed between and in sealed fluid communication with the fluid connector and the second pneumatic tire, the second one-way valve disposed so as to allow fluid to flow to the second pneumatic tire and not from the second pneumatic tire to the fluid connector or to the first pneumatic tire; and
    a third one-way valve disposed so as to prevent pressurized fluid from escaping from the fluid connector to atmosphere when the fluid connector is not connected to the external fluid pressure source.

2. The system of claim 1 further comprising a pressure-relief valve (PRV) in sealed communication with the first and second one-way valves and the fluid connector, wherein the PRV is configured to release fluid when the fluid pressure at the first and second one-way valves reaches a pressure threshold.

3. The system of claim 1, further comprising a pressure regulator in sealed communication with the first and second one-way valves and the fluid connector, wherein the regulator is configured to reduce fluid pressure from the fluid pressure source to a pressure suitable for the first and second pneumatic tires.

4. A method of inflating trailer pneumatic tires, the trailer being capable of being pulled by a non-class 8 vehicle and comprising an axle and a pneumatic tire mounted at each end of the axle, but without air brakes, the method comprising:
    mounting to the trailer a fluid connector configured for sealed fluid communication with an external fluid pressure source not mounted to the trailer or to a tow vehicle;
    providing sealed fluid communication between the fluid connector and each of a first pneumatic tire mounted at one end of an axle and a second pneumatic tire mounted at the other end of the axle;
    providing a first one-way valve in sealed fluid communication with the fluid connector and the first pneumatic tire so as to allow pressurized fluid to flow from the fluid connector to the first pneumatic tire but not from the first pneumatic tire to atmosphere; and
    connecting the fluid connector to the external fluid pressure source so as to allow pressurized fluid to flow from the fluid pressure source to each pneumatic tire substantially simultaneously.

5. The method of claim 4, further comprising providing the first one-way valve in sealed fluid communication with the fluid connector and the second pneumatic tire so as to allow pressurized fluid to flow from the fluid connector to the second pneumatic tire but not from the second pneumatic tire to atmosphere.

6. The method of claim 5, wherein the fluid connector comprises the first one-way valve.

7. The method of claim 5 further comprising providing a pressure-relief valve (PRV) in sealed communication with the first and second pneumatic tires, wherein the PRV is configured to release fluid when the fluid pressure at the first and second pneumatic tires reaches a pressure threshold.

8. The method of claim 6, further comprising providing a pressure regulator in sealed fluid communication with the first and second pneumatic tires, wherein the regulator is configured to reduce fluid pressure from the external fluid pressure source to a pressure suitable for the first and second pneumatic tires.

9. The method of claim 4, further comprising providing a second one-way valve in sealed fluid communication with the fluid connector and the second pneumatic tire so as to allow pressurized fluid to flow from the fluid connector to the second pneumatic tire but not from the second pneumatic tire to atmosphere.

10. The method of claim 9, further comprising:
    further providing the first one-way valve so as to prevent pressurized fluid from flowing from the first pneumatic tire to the second pneumatic tire; and
    further providing the second one-way valve being further provided so as to prevent pressurized fluid from flowing from the second pneumatic tire to the first pneumatic tire.

11. The method of 10, further comprising providing a third one-way valve in sealed fluid communication with the first and second one-way valves and the fluid connector so as to prevent pressurized fluid from flowing from the first and second one-way valves to atmosphere.

12. The method of claim 11, wherein the fluid connector comprises the third one-way valve.

13. The method of claim 10 further comprising providing a pressure-relief valve (PRV) in sealed fluid communication with the first and second one-way valves and the fluid connector, wherein the PRV is configured to release fluid when the fluid pressure at the first and second one-way valves reaches a pressure threshold.

14. The system of claim 13, further comprising providing a pressure regulator in sealed fluid communication with the first and second one-way valves and the fluid connector, wherein the regulator is configured to reduce fluid pressure from the external fluid pressure source to a pressure suitable for the first and second pneumatic tires.

15. A tire inflation system for a trailer capable of being pulled by a non-class 8 vehicle, the trailer comprising an axle and a pneumatic tire mounted at each end of the axle, but without air brakes, the system comprising:
- a first rotary fluid connection mounted at a first end of the trailer axle and in sealed fluid communication with a first pneumatic tire mounted at the first end of the trailer axle;
- a second rotary fluid connection mounted at a second end of the trailer axle and in sealed fluid communication with a second pneumatic tire mounted at the second end of the trailer axle; and
- a fluid connector configured for sealed connection to an external fluid pressure source external to the trailer and the vehicle, the first rotary fluid connection and the second rotary fluid connection being in sealed fluid communication with the fluid connector such that fluid flowing into the fluid connector from the external fluid pressure source may flow substantially simultaneously into the first and second pneumatic tires.

16. The system of claim 15 further comprising:
- a first one-way valve in sealed fluid communication with the fluid connector and the first pneumatic tire, the first one-way valve disposed so as to allow fluid to flow to the first pneumatic tire and not from the first pneumatic tire to the fluid connector or to the second pneumatic tire; and
- a second one-way valve in sealed fluid communication with the fluid connector and the second pneumatic tire, the second one-way valve disposed so as to allow fluid to flow to the second pneumatic tire and not from the second pneumatic tire to the fluid connector or to the first pneumatic tire.

17. The system of claim 16 further comprising a pressure-relief valve (PRV) in sealed communication with the first and second one-way valves and the fluid connector, wherein the PRV is configured to release fluid when the fluid pressure at the first and second one-way valves reaches a pressure threshold.

18. The system of claim 16, further comprising a pressure regulator in sealed communication with the first and second one-way valves and the fluid connector, wherein the regulator is configured to reduce fluid pressure from the fluid pressure source to a pressure suitable for the first and second pneumatic tires.

19. The system of claim 15 further comprising a one-way valve disposed so as to prevent pressurized fluid from escaping from first pneumatic tire and second pneumatic tire to atmosphere when the fluid connector is not connected to the external fluid pressure source.

20. The system of claim 19 further comprising a pressure-relief valve (PRV) in sealed communication with the first and second one-way valves and the fluid connector, wherein the PRV is configured to release fluid when the fluid pressure at the first and second one-way valves reaches a pressure threshold.

21. The system of claim 19, further comprising a pressure regulator in sealed communication with the first and second one-way valves and the fluid connector, wherein the regulator is configured to reduce fluid pressure from the fluid pressure source to a pressure suitable for the first and second pneumatic tires.

* * * * *